US011212768B2

(12) United States Patent
Yang et al.

(10) Patent No.: US 11,212,768 B2
(45) Date of Patent: Dec. 28, 2021

(54) DENSIFYING A MOBILITY NETWORK BY SITING ANTENNAS WITH DEMAND ZONE PLANNING, IN A COMMUNICATIONS NETWORK

(71) Applicant: AT&T Intellectual Property I, L.P., Atlanta, GA (US)

(72) Inventors: Yuning Yang, Basking Ridge, NJ (US); Jie Chen, Watchung, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/890,493

(22) Filed: Jun. 2, 2020

(65) Prior Publication Data

US 2021/0377903 A1   Dec. 2, 2021

(51) Int. Cl.
*H04W 64/00* (2009.01)
*H04W 16/14* (2009.01)
*H04W 16/18* (2009.01)
*H04W 24/02* (2009.01)
(Continued)

(52) U.S. Cl.
CPC .......... *H04W 64/003* (2013.01); *H04L 41/16* (2013.01); *H04W 4/029* (2018.02); *H04W 16/14* (2013.01); *H04W 16/18* (2013.01); *H04W 24/02* (2013.01)

(58) Field of Classification Search
CPC ..... H04W 64/00; H04W 16/14; H04W 4/029; H04W 24/02; H04W 16/18; H04W 64/003; H04W 88/00; H04W 88/02; H04W 88/08; H04W 88/06; H04W 88/18; H04W 16/00; H04W 16/02; H04W 16/04; H04W 16/22; H04W 16/24; H04W 16/26; H04W 16/16; H04L 12/24; H04L 41/16; H04L 12/16; H04L 41/18; H04L 41/20; H01Q 1/521; H01Q 1/523; H01Q 1/525; H01Q 21/06; H01Q 25/00; H01Q 25/002; H01Q 3/2629; H01Q 3/2635; G06K 7/10356; G06K 7/10316; H04B 1/005; H04B 1/0053; H04B 1/0064; H04B 1/1009; H04B 7/04;
(Continued)

(56) References Cited

U.S. PATENT DOCUMENTS 5,613,217 A * 3/1997 Hogstrom et al. ........... 455/67.1
9,237,574 B2 * 1/2016 Nakamura et al. ..........
                                                 H04W 72/0453
10,820,211 B1 * 10/2020 Bashir .................. H04W 16/14
(Continued)

*Primary Examiner* — Meless N Zewdu
(74) *Attorney, Agent, or Firm* — Amin, Turocy & Watson, LLP

(57) ABSTRACT

The technologies described herein are generally directed to facilitating operation of a system for implementing fifth generation (5G) or other next generation networks. In accordance with one or more embodiments, a method described herein can include identifying, by a device comprising a processor, predicted resource usage of a first antenna covering a geographic zone. Further, the method can include selecting, by the device, a group of geographic siting locations within the geographic zone for potentially siting ones of a group of second antennas. In addition, selecting, by the device, a spatial arrangement in relation to the first antenna, of a subset of the group of geographic siting locations can occur, with a selected spatial arrangement including an arrangement to maintain the predicted resource usage in the condition.

20 Claims, 10 Drawing Sheets

(51) Int. Cl.
*H04L 12/24* (2006.01)
*H04W 4/029* (2018.01)

(58) Field of Classification Search
CPC ...... H04B 7/0491; H04B 7/0608; H04B 7/02; H04B 7/024
See application file for complete search history.

(56) References Cited

U.S. PATENT DOCUMENTS

| | | | |
|---|---|---|---|
| 2004/0017312 A1* | 1/2004 | Anderson et al. | 342/457 |
| 2004/0259555 A1* | 12/2004 | Rappaport et al. | 455/446 |
| 2009/0010176 A1* | 1/2009 | Huang et al. | 370/252 |
| 2014/0031047 A1* | 1/2014 | Jovanovic et al. | H04W 16/04 |
| 2017/0150365 A1* | 5/2017 | Goswami et al. | H04W 16/04 |
| 2019/0364492 A1* | 11/2019 | Azizi et al. | H04W 48/16 |
| 2020/0267558 A1* | 8/2020 | Vamanan et al. | H04W 16/10 |

* cited by examiner

DENSIFYING A MOBILITY NETWORK BY SITING ANTENNAS WITH DEMAND ZONE PLANNING, IN A COMMUNICATIONS NETWORK

TECHNICAL FIELD

The subject application is related to implementation of fifth generation (5G) or other next generation wireless communication systems, and, for example, placement of antennas used to implement next generation networks.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
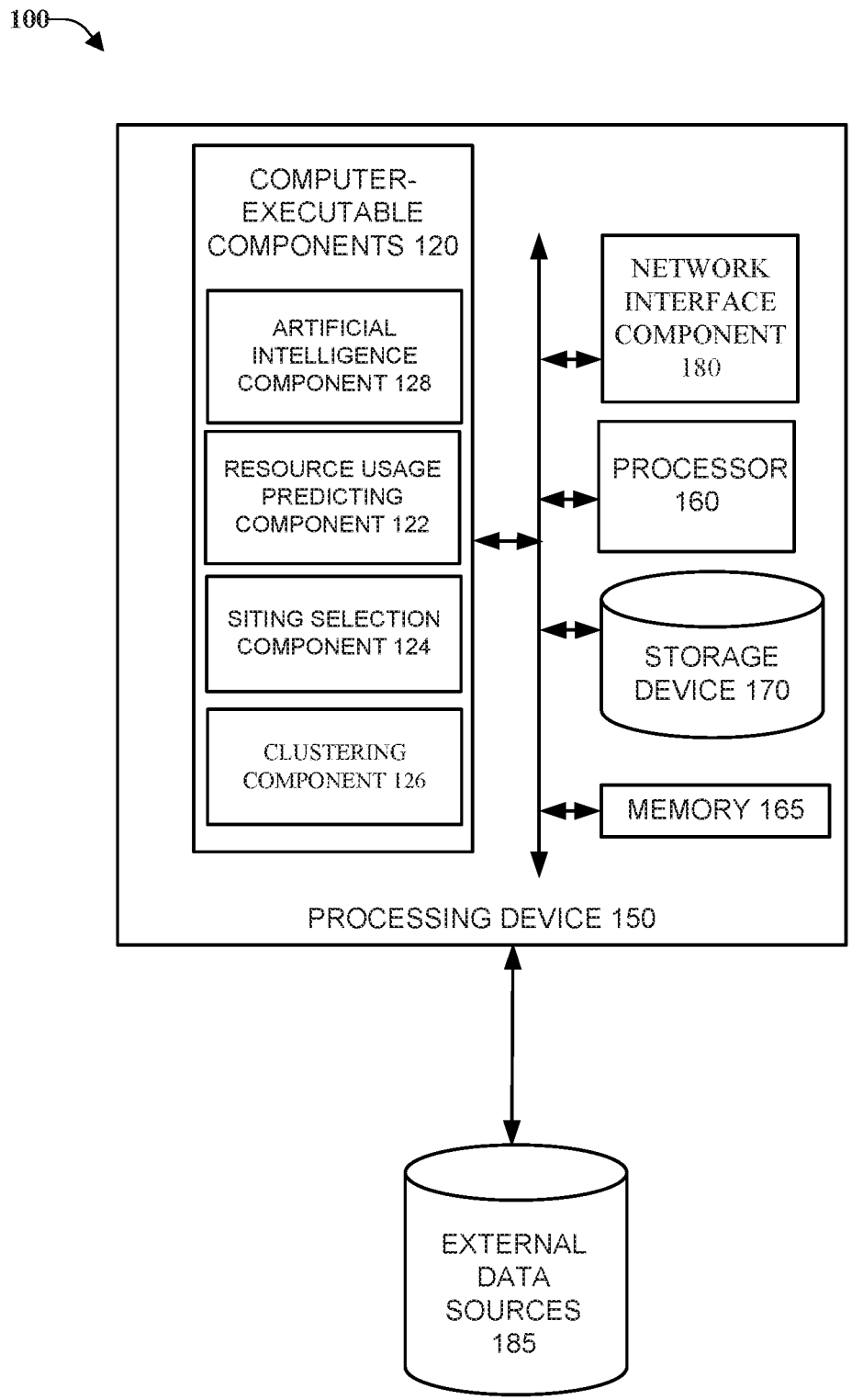
FIG. 1 is an architecture diagram of an example system that can facilitate implementation of a cellular network in a given geographic area by identifying candidate sites for placement of antennas, in accordance with one or more embodiments.

Generally speaking, one or more embodiments described herein can facilitate densifying a mobility network by siting antennas using geographically specific predictions of future demand. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS).

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., decoding wireless signals to determine patient information, rapidly analyzing different treatment options, and allocating network resources based on patient status), that are not abstract and cannot be performed as a set of mental acts by a human. For example, a human, or even a plurality of humans, cannot efficiently integrate wireless data receipt and demodulation (which generally cannot be performed manually by a human) and detailed analysis of resource usage patterns, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate generating an implementation design for deploying a 5G small-cell cellular network in a given geographic area, e.g., an optimized system that can maximize coverage and capacity while minimizing cost. It should be noted that the subject disclosure may be embodied in many different forms and should not be construed as limited to this example or other examples set forth herein.

FIG. 1 is an architecture diagram of an example system 100 that can facilitate sustaining a cellular network in a given geographic area by identifying candidate sites for placement of additional network components, in accordance with one or more embodiments. For purposes of brevity, description of like elements and/or processes employed in other embodiments is omitted.

System 100 can include processing device 150 coupled to data sources 185. In one or more embodiments, processing device can include memory 165, processor 160, storage device 170, as well as other components to implement and provide functions for system 100, and other embodiments described herein. Computer executable components 120 can include instructions that, when executed by processor 160, can facilitate performance of operations defined by the executable component(s) and/or instruction(s), e.g., artificial intelligence component 128, resource usage predicting component 122, siting selection component 124, clustering component 126, and additional components which can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, server system 150 can further comprise various computer and/or computing-based elements described herein with reference to operating environment 1000 and FIG. 10.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

Networks that can be facilitated by one or more implementations described herein can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like.

For example, in at least one implementation, system 100 can be used to facilitate the implementation of parts of a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.). One or more embodiments can facilitate the placement of multiple antennas in a geographic area enabling coverage by networks that include, but are not limited to, communication service provider networks. In exemplary, non-limiting embodiments described herein, simulated groups of antennas can include millimeter wave (mmWave) antennas of a base station of a cellular network, e.g., a fifth generation or other next generation RAN. In certain implementations of types of mmWave antennas, large numbers of antennas are deployed in comparison with the number of other types of antennas that can be employed, e.g., up to and exceeding in some circumstances, one hundred antennas per square mile.

Figure 2:
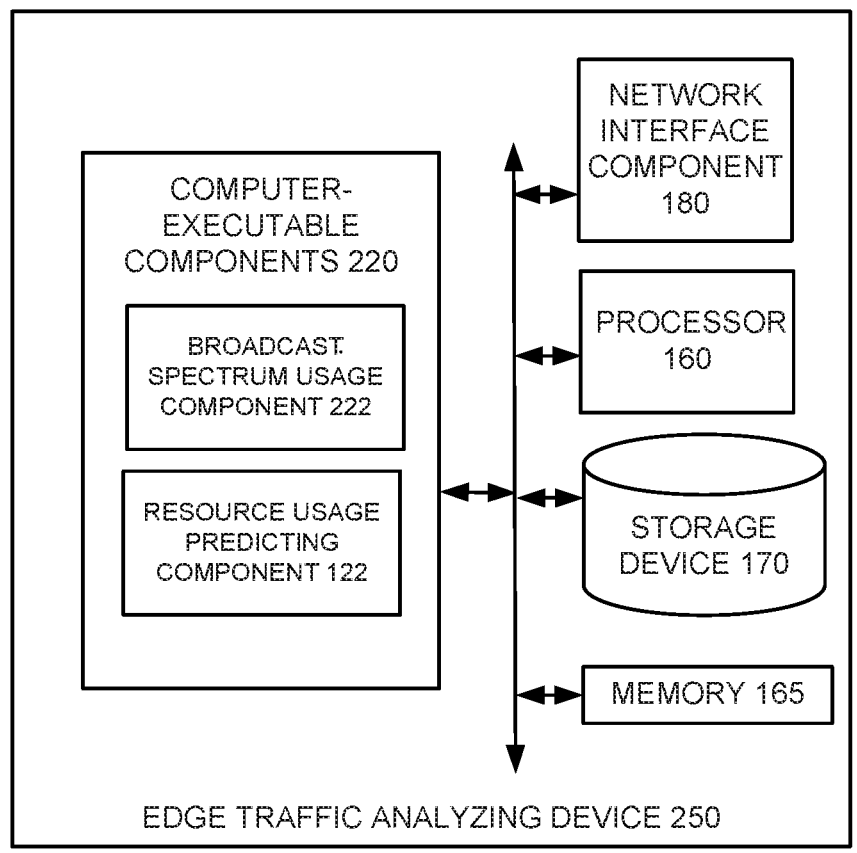
FIG. 2 is an architecture diagram of an example system that can facilitate implementation of a cellular network in a given geographic area, in accordance with one or more embodiments.

As discussed with FIG. 3 below, one or more embodiments can predict geographically specific demands for resources in some types of wireless networks. Generally speaking, different data sources can be used as inputs, including measurements of aspects of the operating network, e.g., radio frequency coverage and quality, as well as other data source that can include, but are not limited to, high resolution traffic demand maps, macro spectrum-exhaust trigger forecasts and clutter data etc. FIG. 2 provides an example of a traffic analyzing device that can provide different measurements of a wireless network for use by one or more embodiments.

As discussed with FIGS. 4A-B below, machine learning and optimization techniques can be used by some embodiments to process input data and generate upgrade polygons that overlay existing macrocells and depict different solutions for advantageously deploying additional resources, e.g., supplementing (or replacing) operation of macrocells with collections of microcells. In one or more embodiments, upgrade polygons can be tagged with information that can include, but is not limited to forecasted resource-exhaust timeframes, the estimated number of additional nodes requested or required, expected traffic offload, expected physical resource block offload.

In one or more embodiments, computer and/or computing-based elements 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining resource usage predicting component 122. Example operations that resource usage predicting component 122 that can facilitate for system 100 can include, identifying, by operations of processor 160, predicted resource usage of a first antenna covering a geographic zone.

In this example, the first antenna of the example can be a macrocell radio access node of a network, e.g., a base station with a broad coverage area. Example coverage areas of macrocells described herein include, but are not limited to, greater than ten kilometers for rural coverage areas, between two and ten kilometers for suburban coverage areas, and less than two kilometers for urban coverage areas. As described with the discussion of FIGS. 3 and 4 below, in one or more embodiments, the geographic zone can comprise a coverage area for the first antenna, and the resources evaluated by embodiments can comprise available broadcast spectrum for the first antenna to serve communication demand of user equipments within the geographic zone.

In one or more embodiments, predicted broadcast spectrum can be broadcast spectrum available at a future time, and can be based on a measured indication of broadcast spectrum exhaustion in the geographic zone. In one or more embodiments, the measured indication of broadcast spectrum exhaustion can be determined based on measuring the broadcast spectrum usage within the geographic zone, over time, e.g., samples collected in different usage situations, such as time of day, date, and surges in traffic demands or requirements, such as from temporary increases in demand from events including, sporting events, concerts, and holiday weekends.

In one or more embodiments, computer executable components 120 can further include instructions that, when executed by processor 160, can facilitate performance of operations defining siting selection component 124. Example operations that siting selection component 124 can facilitate for system 100 include selecting a group of geographic siting locations within the geographic zone for potentially siting ones of a group of second antennas, e.g., as discussed with FIGS. 3-4 below.

In some implementations, the selecting of the group of geographic siting locations can result in a group of geographic siting locations for potentially siting second antennas. Additionally, in one or more implementations the selecting can be based on utilizing the group of second antennas to maintain the predicted resource usage in a condition in relation to a threshold value. In one or more embodiments, the threshold value can refer to a level of resource availability, and wherein the condition can be an implication of available resource capacity for the first antenna, within the geographic zone, e.g., as discussed with FIGS. 3-4 below.

In one or more embodiments, computer executable components 120 can include instructions that, when executed by processor 160, can facilitate performance of operations defining a clustering component 126. Example operations that siting selection component 124 that can facilitate for system 100 include selecting, by the device, a spatial arrangement in relation to the first antenna, of a subset of the group of geographic siting locations, with a selected spatial arrangement including an arrangement to maintain the predicted resource usage in the condition, e.g., as discussed with FIGS. 4A-B below.

In additional implementations, siting selection component 122, can further facilitate ranking the available sites based on selected criteria, resulting in candidate sites selected from the available group of geographic locations. Example criteria that can be used for ranking available sites include, but are not limited to, an estimated cost determined to be associated with locating an antenna at a geographic location of the available group of geographic locations. In variations to this implementation, the estimated cost of locating the antenna can include different factors, e.g., as discussed with FIG. 3 below, a distance to a connection to a backhaul network.

In one or more embodiments, based on the spatial arrangement of the subset of the group of geographic siting locations, the spatial arrangement generated can facilitate placing second antennas at the subset of the group of geographic siting locations.

FIG. 2 is an architecture diagram of an example system that can facilitate implementation of a cellular network in a given geographic area, in accordance with one or more embodiments. For purposes of brevity, description of like elements and/or processes employed in other embodiments is omitted.

System 200 can include traffic analyzing device 250, including memory 165, processor 160, storage device 170, as well as other components to implement and provide functions for system 100, and other embodiments described herein. Computer executable components 120 can include instructions that, when executed by processor 160, can facilitate performance of operations defined by the executable component(s) and/or instruction(s), e.g., resource usage predicting component 122, broadcast spectrum usage component 222, and additional components which can improve the operation of system 200. It should be appreciated that these components, as well as aspects of the embodiments of the subject disclosure depicted in this figure and various figures disclosed herein, are for illustration only, and as such, the architecture of such embodiments are not limited to can further comprise various computer and/or computing-based elements described herein with reference to operating environment 1000 and FIG. 10.

As depicted, FIG. 2 provides an example collection of components that can collect information about the operation of a wireless network, e.g., radio frequency coverage, quality of service, congestion, and available spectrum usage. For example, in one or more embodiments, computer and/or computing-based elements 120 can be used in connection with implementing one or more of the systems, devices, components, and/or computer-implemented operations shown and described in connection with FIG. 2 or other figures disclosed herein. In one or more embodiments, computer executable components 120 can include instructions discussed below that, when executed by processor 160, can facilitate performance of operations defining broadcasting spectrum usage component 222. Example operations that resource usage predicting component 122 can facilitate for system 200 can include, identifying usage of a resource of a geographic coverage zone, e.g., broadcast spectrum for sending and receiving signals.

It should be appreciated that the embodiments of the subject disclosure depicted in FIG. 2 and various figures disclosed herein are for illustration only, and as such, the architecture of such embodiments are not limited to the systems, devices, and/or components depicted therein. For example, in some embodiments, traffic analyzing device 250 can further comprise various computer and/or computing-based elements described the systems, devices, and/or components depicted therein. For example, in some embodiments, server system 150 herein can include additional components discussed with reference to operating environment 1000 and FIG. 10.

Figure 3:
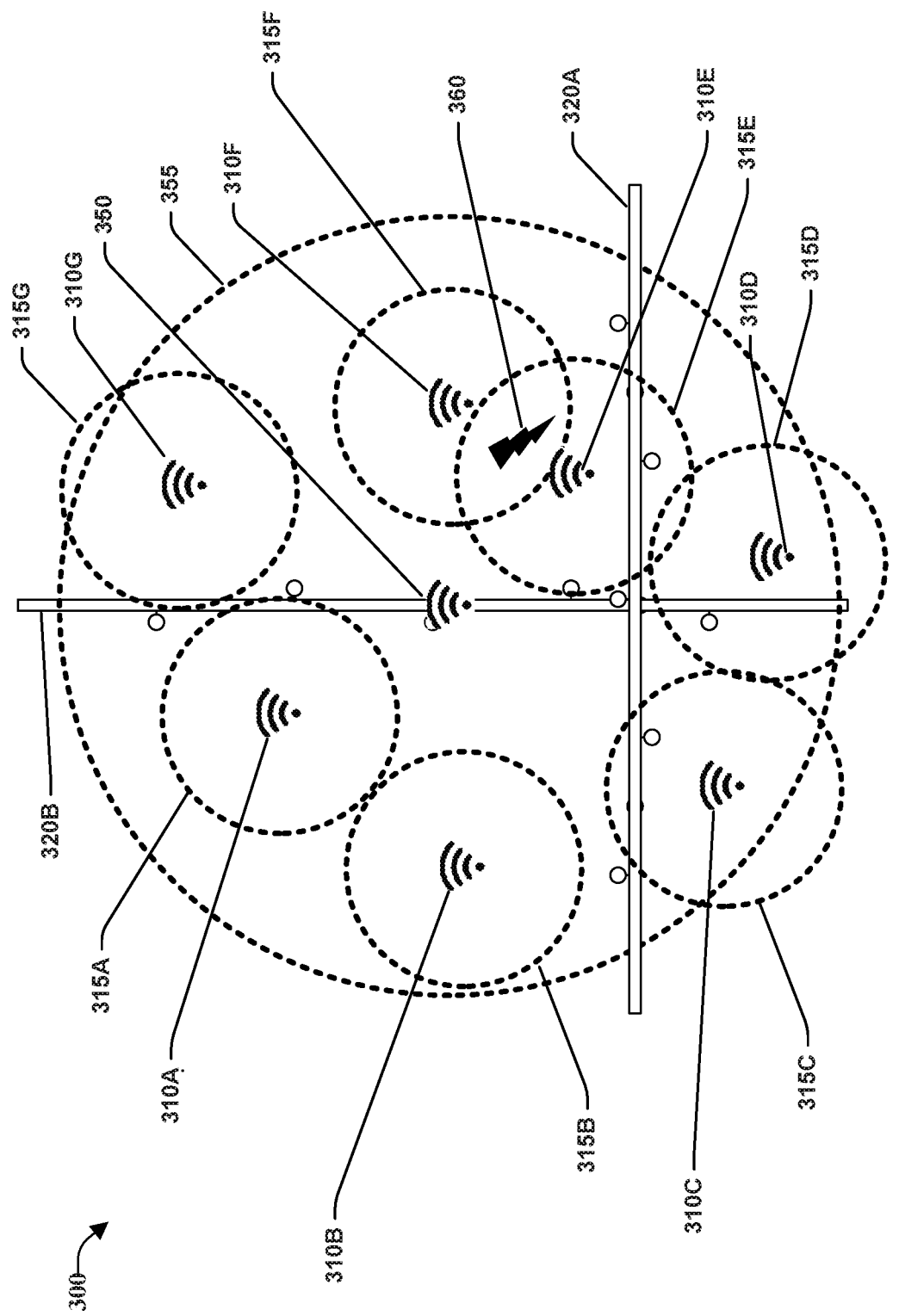
FIG. 3 is a diagram of an example layout of potential sites for placement of microcell antennas in relation to a macro-cell antenna, in accordance with one or more embodiments.

FIG. 3 is a diagram of an example layout of potential sites for placement of microcell antennas in relation to a macrocell antenna, in accordance with one or more embodiments. For purposes of brevity, description of like elements and/or processes employed in other embodiments is omitted.

Continuing the examples discussed with FIGS. 1 and 2 above, FIG. 3 depicts macrocell 350 with a coverage area 355. As noted above, and as would be appreciated by one having skill in the relevant art(s), given the description herein, if, after the deployment of macrocell 350, characteristics of the devices consuming the signals of macrocell change, resources available to macrocell 350 can be exceeded. Example characteristics of consuming devices that can lead to the kinds of resource depletion discussed herein, include but are not limited to, the distribution of consuming devices within coverage area 355, the amount of consuming devices, the type of traffic requested by the consuming devices (e.g., higher bandwidth traffic), and the amount of interference with aspects of the signal, e.g., some interference can reduce access to certain resources, such as bandwidth.

One approach that can be taken by one or more embodiments is to divide coverage area 355 into geographic bins of characteristics to be analyzed and compared. As noted above, coverage area 355 can change based on placement of macrocell 355, e.g., greater than ten kilometers from macrocell 350 for rural coverage areas, between two and ten kilometers from macrocell 350 for suburban coverage areas, and less than two kilometers for urban coverage areas. In one or more implementations of some embodiments described herein, the size of the geographic bins used to analyze coverage area 355, can vary based upon the size of coverage area 355, e.g., based on a radius of coverage area 355. Another way this coverage area can be expressed is by a measurement of the distance to another macrocell in the network. Example sizes for geographic bins that can be used by one or more embodiments include six-hundred and twenty-five (625) square meters for rural macrocells (e.g., 25 m by 25 m), and one-hundred square meters for urban environments, e.g., 10 m by 10 m.

Once the coverage area 355 is divided into geographic bins, the bins can be analyzed based on factors including, but not limited to, current spectrum-exhaustion, coverage, quality, capacity, and clutter. One having skill in the relevant art(s), given the description herein, will appreciate that geographic bins can be qualified for clustering based on combination of characteristics that exceed a threshold. FIG. 3 depicts some factors that can influence some embodiments in the potential placement of microcells. For example, one or more embodiments can assess sites 310A-G based on a cost of placing microcell equipment at a particular site. One way that one or more embodiments can assess cost of siting equipment is by determining a distance from the site to a backhaul connection for operation of the microcell. In this example, the backhaul connections are fiber backhaul lines 320A-B, but other types of backhaul connections can be evaluated by one or more embodiments. Thus, when selecting site 310C for potential placement of a microcell, to augment the performance of coverage area 355, the distance from site 310C to fiber backhaul 320A can be considered. In addition, by using this measurement as an indication of the cost of deployment, other costs of deployment can be used for comparison, e.g., site 310B is more distant than site 310C from fiber backhauls 320A-B, and this can be used to favor site 310C over 310B.

In addition, in one or more embodiments, geographic bins can be excluded from further analysis based on strong interference (e.g., greater than −75 dbm) from interference sources, e.g., macrocell 350. For example, as depicted in FIG. 3, interference can also occur with potential microcell sites, e.g., sites 310E and 320F have potential interference 360.

In some implementations, for some types of antennas, geographic bins that area determined to be indoors (e.g., as determined by cross reference with GIS data sources 180) can be disqualified from consideration. Also dependent upon implementations, for some types of antennas, geographic bins determined to be broadcasting to areas of high-mobility (e.g., road intersections, highways) can be removed from consideration.

As discussed throughout this disclosure, one benefit that can accrue from one or more embodiments is the early planning for increasing of available resources to coverage area 355 by placing additional transceivers within the coverage area, e.g., also termed densifying a coverage area herein. Example resources include the bandwidth available for use by macrocell 350 to reach particular devices. FIG. 3 depicts potential sites 310A-G for potential microcell placement to effect the densifying of coverage area 355 along with indications of the estimated short-range coverages 315A-G of respective microcell sites 310A-G.

Figure 4A:
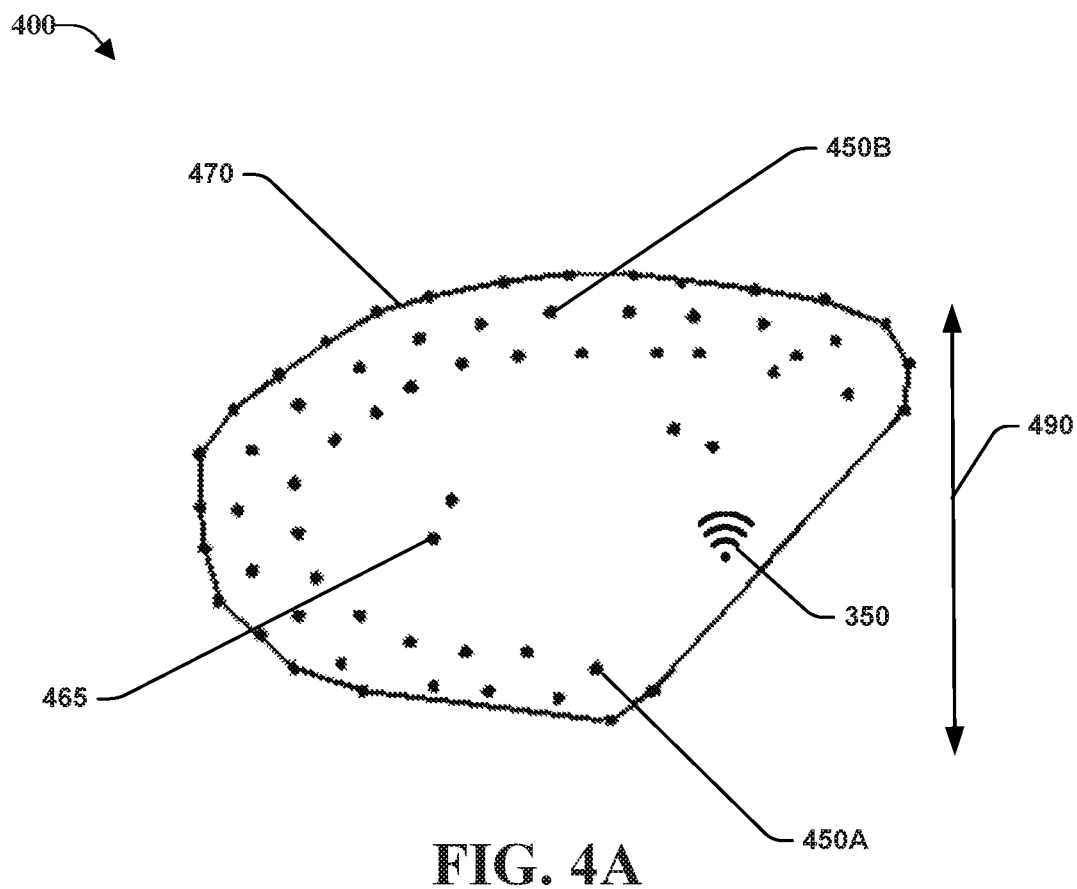
FIGS. 4A and 4B depict an example map of analysis sectors of a geographical area, in accordance with one or more embodiments.
Figure 4B:
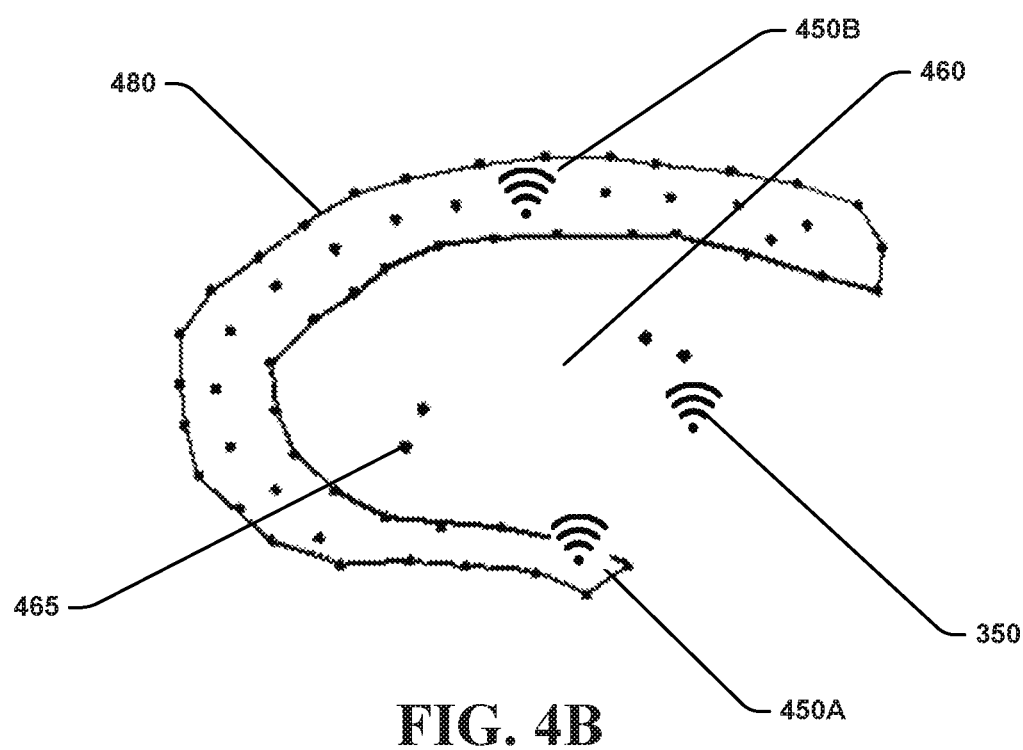

FIGS. 4A and 4B depict an example diagram of analysis sectors of a geographical area, in accordance with one or more embodiments. For purposes of brevity, description of like elements and/or processes employed in other embodiments is omitted. FIG. 4A includes qualified geographic bins 450A-B and 465, macrocell 350. As described further below, one or more embodiments can use different approaches to group qualified geographic bins into cluster group 470, and further beneficially exclude sites 465 from inclusion in a resource upgrade area.

In one or more embodiments, qualified bins can be grouped into clusters with a selected cluster size 490, depending on different factors including, but not limited to the distance between the site of macrocell 350 and one or more other macrocells. Different approaches can be used to form geographic bins 450A-B and 465 into cluster group 470. As noted above, computer-executable components 120 can include clustering component 126 and artificial intelligence component 128.

One having skill in the relevant art(s), given the description herein will appreciate different clustering approaches that can be used, given different characteristics of qualified geographic sites discussed above. In an exemplary embodiment, a neural network can be used for clustering based on unsupervised machine learning. In this approach, given different parameters (e.g., including but not limited to, resource exhaustion, coverage, interference) clusters can be formed so as to maintain or improve predicted resource usage in selected, beneficial zone, over time, e.g., by using thresholds.

As depicted in FIG. 4A, the cluster group can incorporate qualified geographic bins in cluster group 470, based on selected cluster size 490. It should be noted that, depending upon the qualified geographic bins analyzed, many different clusters can be formed. As described further with FIG. 4B below, different criteria can be used to improve the shape of selected results determined.

FIG. 4B includes cluster group 470, and an area 460, where geographic bins have only sparsely been qualified, e.g., based on interference from macrocell 350, discussed above, only qualified sites 465 were selected in previously described steps.

Area 460 labels a portion of cluster group 470 where geographic bins have only sparsely been qualified. This sparse qualification can occur for different reasons, including these sites being exceptions to the general characteristics of geographic bins surrounding them. In the example depicted in FIG. 4B, geographic bin 465 can have less interference from macrocell 350, and thus has been qualified for clustering. In some circumstances, one or more embodiments can beneficially identify a hot zone 480 of geographic bins that form a concave hull inside cluster group 470.

In one or more embodiments, to further improve results, hot zones can be evaluated and ranked according to different criteria, including but not limited to the evaluating criteria described above, with an exemplary factor including physical resource block offloading efficiency per node included in hot zone 480. Hot zones can also include meta-data that can improve selection and implementation over time, e.g., spectrum shortage and spectrum exhaust trigger month.

Figure 5:
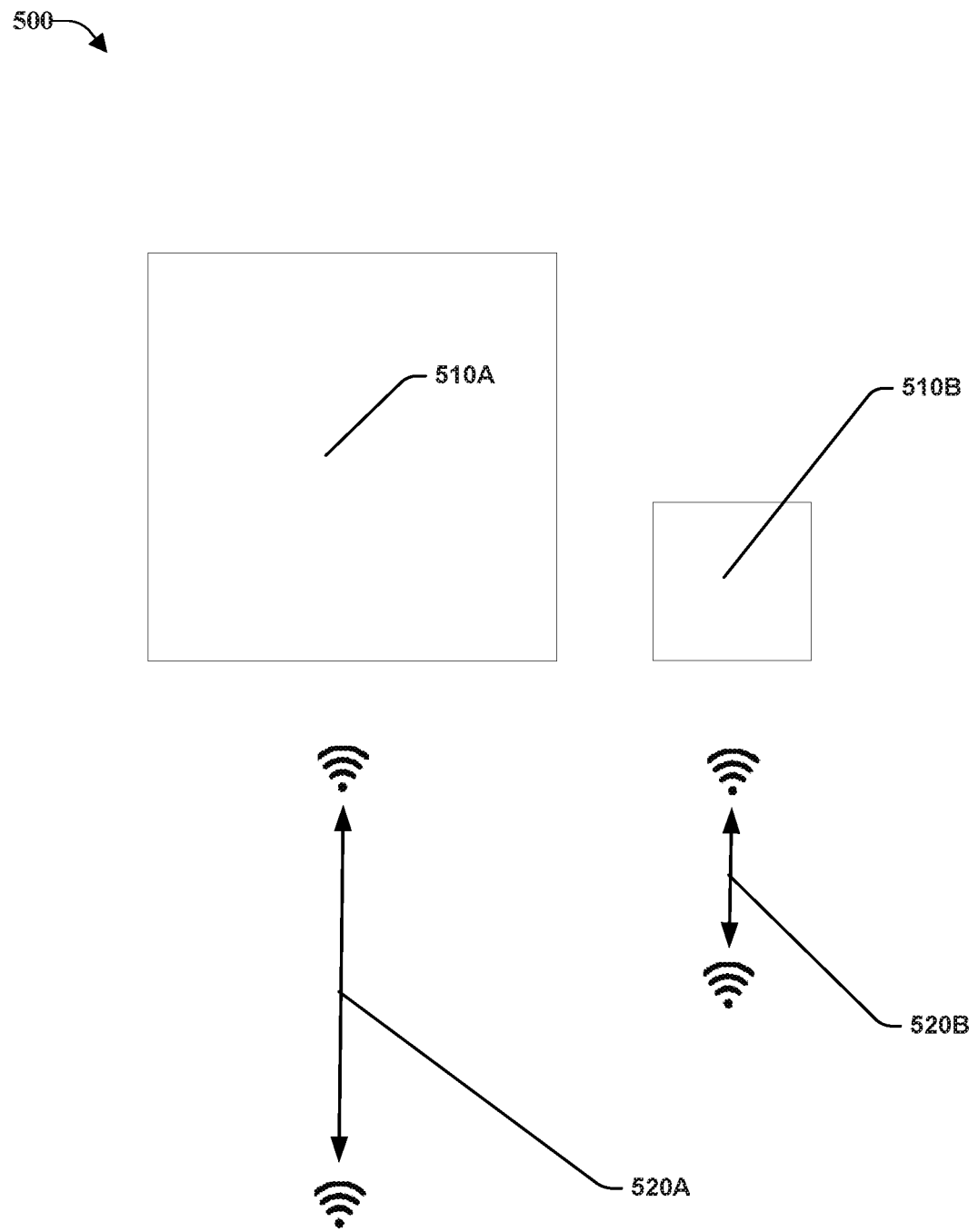
FIG. 5 depicts an example of different sizes of sectors that can be analyzed, and an illustration of some factors that can set the size of sectors, in accordance with one or more embodiments.

FIG. 5 depicts an example of different sizes of geographic bins and geographic cluster sizes 490 that can be analyzed, and an illustration of some factors that can set the size of sectors, in accordance with one or more embodiments. For purposes of brevity, description of like elements and/or processes employed in other embodiments is omitted.

It should be noted that different embodiments describe herein can advantageously have geographic cluster sizes 490 that match the coverage areas of the macrocells analyzed. For example, when inter-site distance (ISD) 520A is less than two kilometers (e.g., urban zones 520B), cluster size 510B can be set to 500 meters, when ISD is between two kilometers and ten kilometers (e.g., urban/suburban), cluster size can be set to one thousand meters, and ISD is greater than ten kilometers (e.g., suburban/rural 520A), cluster size 510A can be set to five thousand meters.

Figure 6:
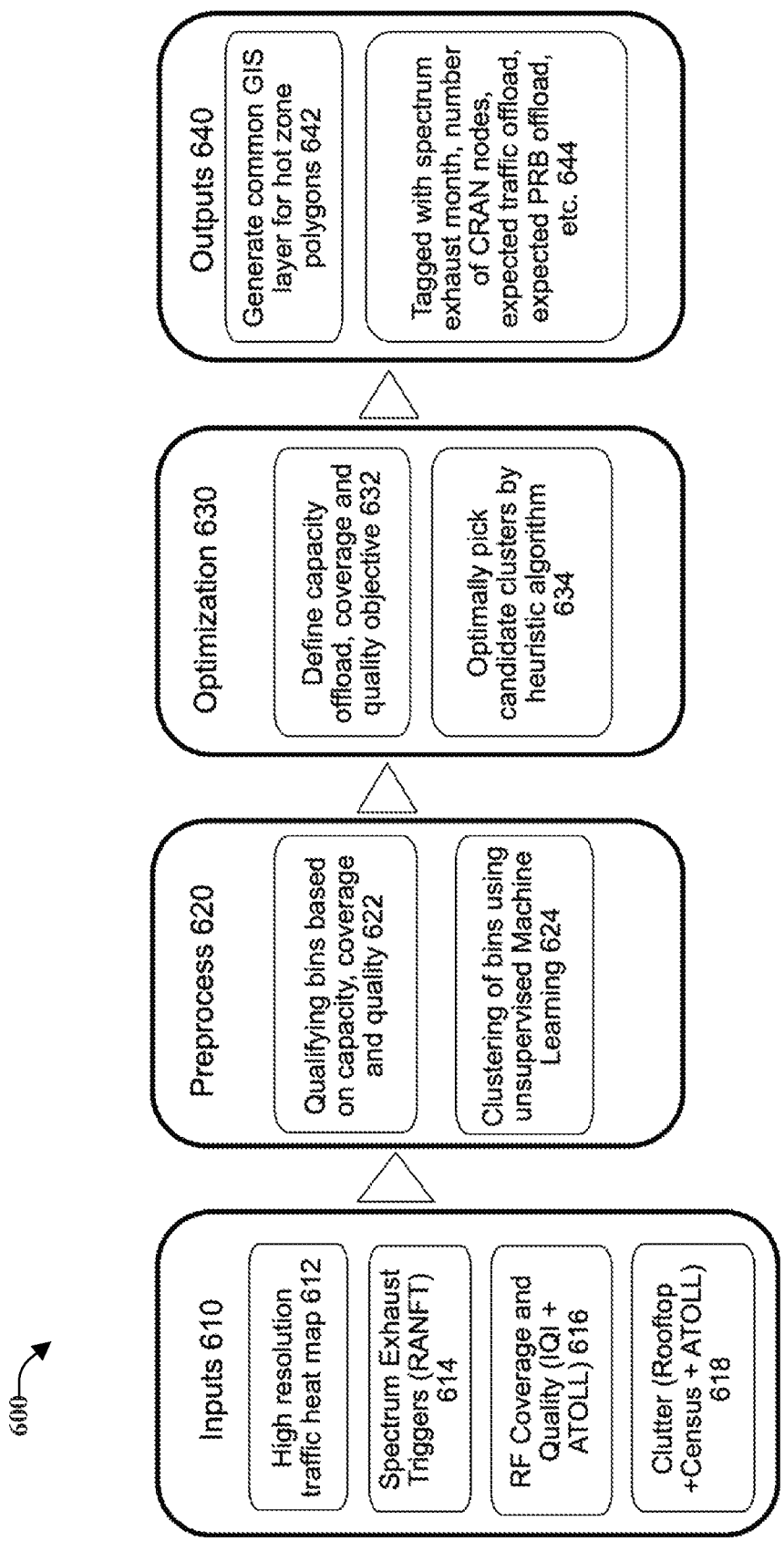
FIG. 6 depicts an example flow diagram that can facilitate upgrade planning in a given geographic area, in accordance with one or more embodiments.

FIG. 6 depicts an example flow diagram 600 that can facilitate upgrade planning in a given geographic area, in accordance with one or more embodiments. For purposes of brevity, description of like elements and/or processes employed in other embodiments is omitted. At 610 of flow diagram 600 of FIG. 6, inputs can be received that can facilitate the qualification of geographic bins for further analysis. Inputs can include, but are not limited to high-resolution heat map 612, spectrum exhaust triggers, RF coverage and quality 616, and clutter (rooftop+census+ ATOLL) 618. At 620, preprocessing can be applied to qualify bins based on capacity, coverage, and quality 622, and clustering of bins can be performed by unsupervised machine learning 624.

At 630, optimization can occur, where capacity, offload, and quality objective, can be defined 632. Candidate cluster can then be selected by heuristic algorithm 634. At 640, outputs can be generated, including a common GIS layer for selected upgrade zone polygons 642. Further, metadata can be added that can include, spectrum exhaust and scheduling data.

Figure 7:
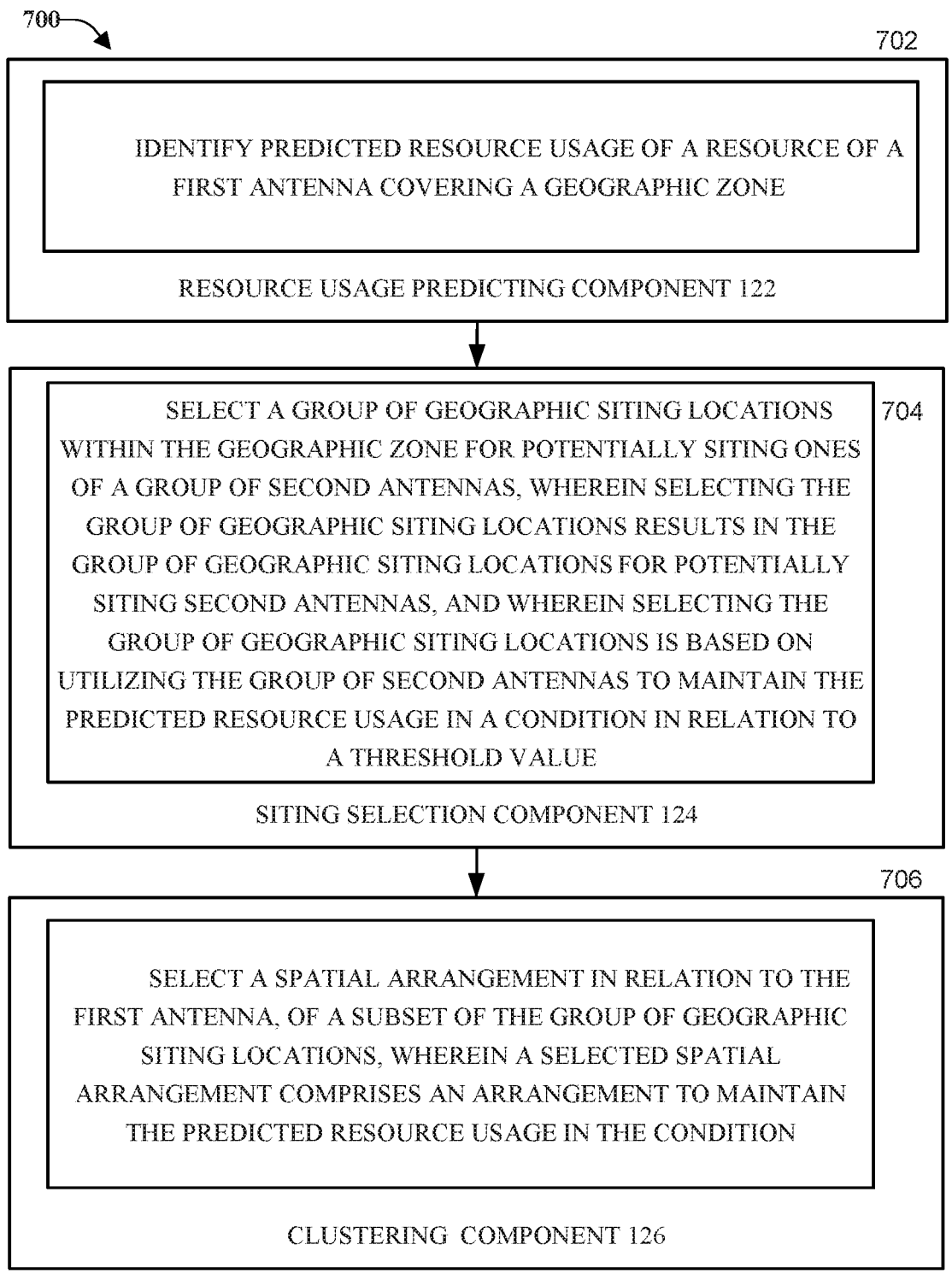
FIG. 7 illustrates an example system that can facilitate predicting upgrade requests or requirements for wireless networks, in accordance with one or more embodiments.

FIG. 7 illustrates an example system 700 that can facilitate predicting upgrade requests or requirements for wireless networks, in accordance with one or more embodiments. For purposes of brevity, description of like elements and/or processes employed in other embodiments is omitted.

In one or more embodiments, resource usage predicting component 122 can be configured to identify predicted resource usage of a first antenna covering a geographic zone. Further, in one or more embodiments, siting selection component 124 can be configured to select a group of geographic siting locations within the geographic zone for potentially siting ones of a group of second antennas, with the selecting can result in a group of geographic siting locations for potentially siting second antennas, and is based on utilizing the group of second antennas to maintain the predicted resource usage in a condition in relation to a threshold value. Additionally, in one or more embodiments, clustering component 126 can be configured to select, by the device, a spatial arrangement in relation to the first antenna, of a subset of the group of geographic siting locations, wherein a selected spatial arrangement comprises an arrangement to maintain the predicted resource usage in the condition.

Figure 8:
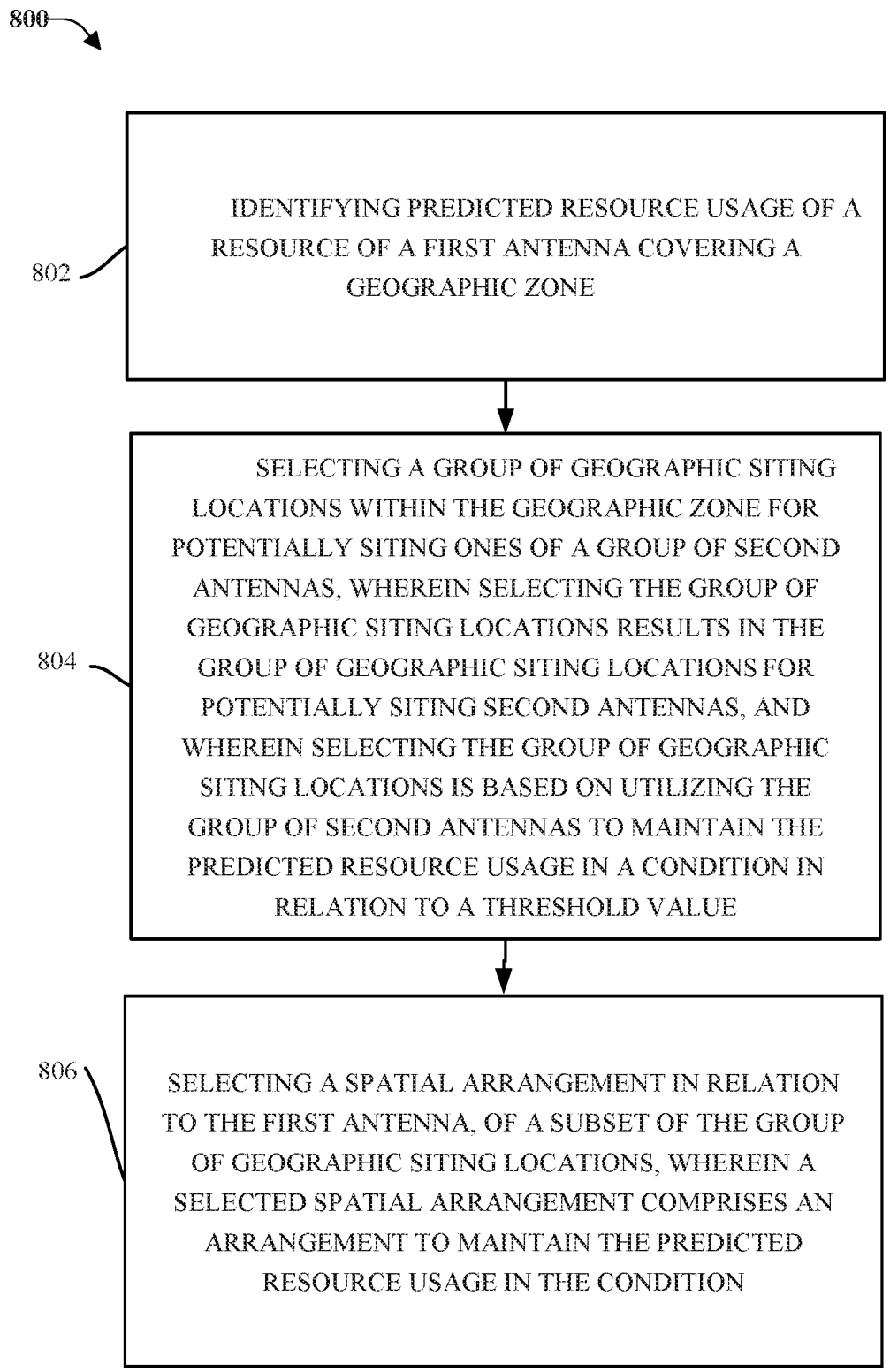
FIG. 8 illustrates a flow diagram of an example method that can facilitate iteratively simulating coverage of antennas in a cellular network for a given geographic area, in accordance with one or more embodiments.

FIG. 8 illustrates a flow diagram of an example method 800 that can facilitate predicting upgrade requests or requirements for wireless networks, in accordance with one or more embodiments. For purposes of brevity, description of like elements and/or processes employed in other embodiments is omitted.

At 802, method 800 can comprise identifying, by a device comprising a processor, predicted resource usage of a first antenna covering a geographic zone. Further, at 804, method 800 can comprise selecting, by the device, a group of geographic siting locations within the geographic zone for potentially siting ones of a group of second antennas, with the selecting can result in a group of geographic siting locations for potentially siting second antennas, and is based on utilizing the group of second antennas to maintain the predicted resource usage in a condition in relation to a threshold value.

Additionally, at 806, method 800 can comprise selecting, by the device, a spatial arrangement in relation to the first antenna, of a subset of the group of geographic siting locations, wherein a selected spatial arrangement comprises an arrangement to maintain the predicted resource usage in the condition.

Figure 9:
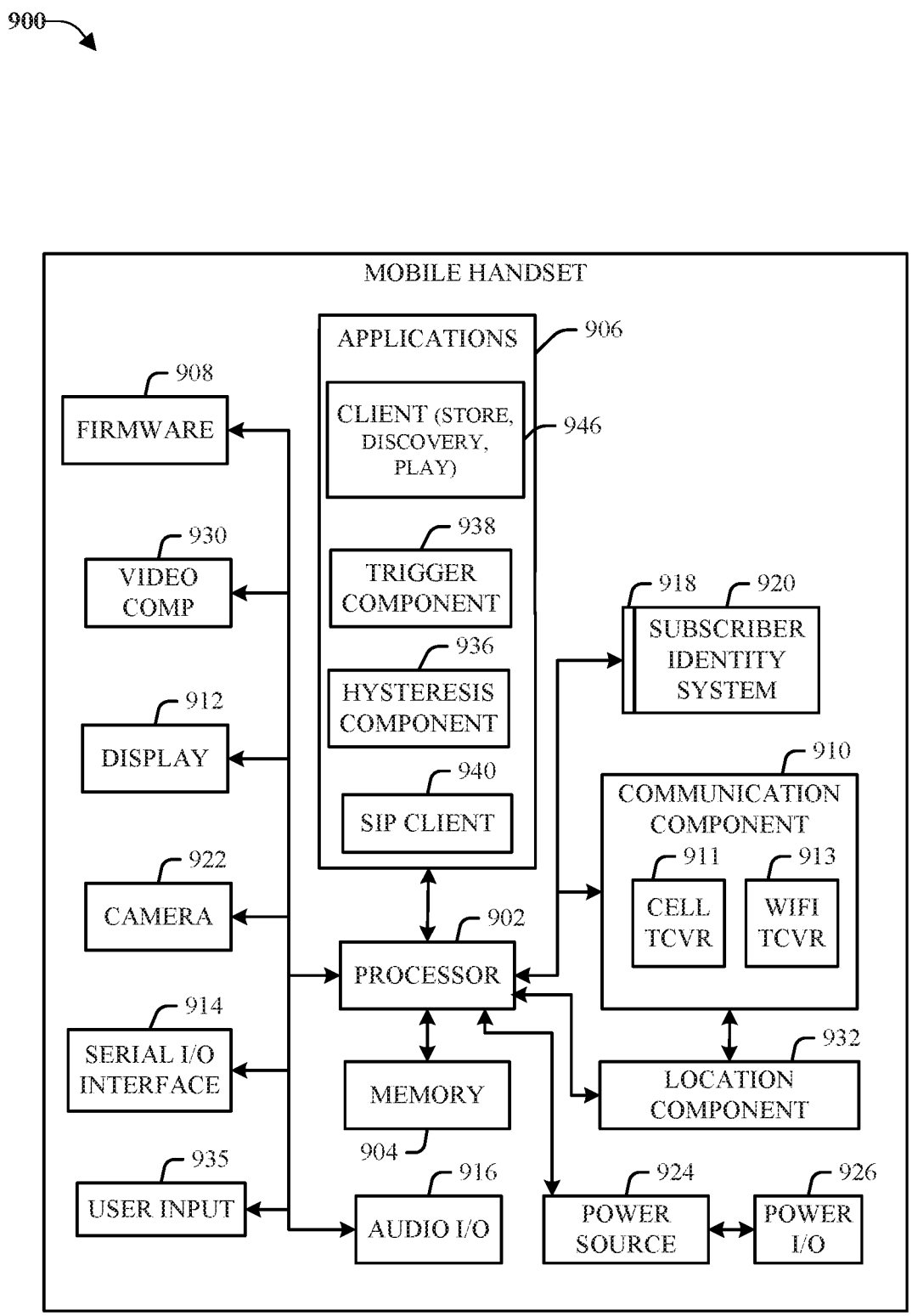
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
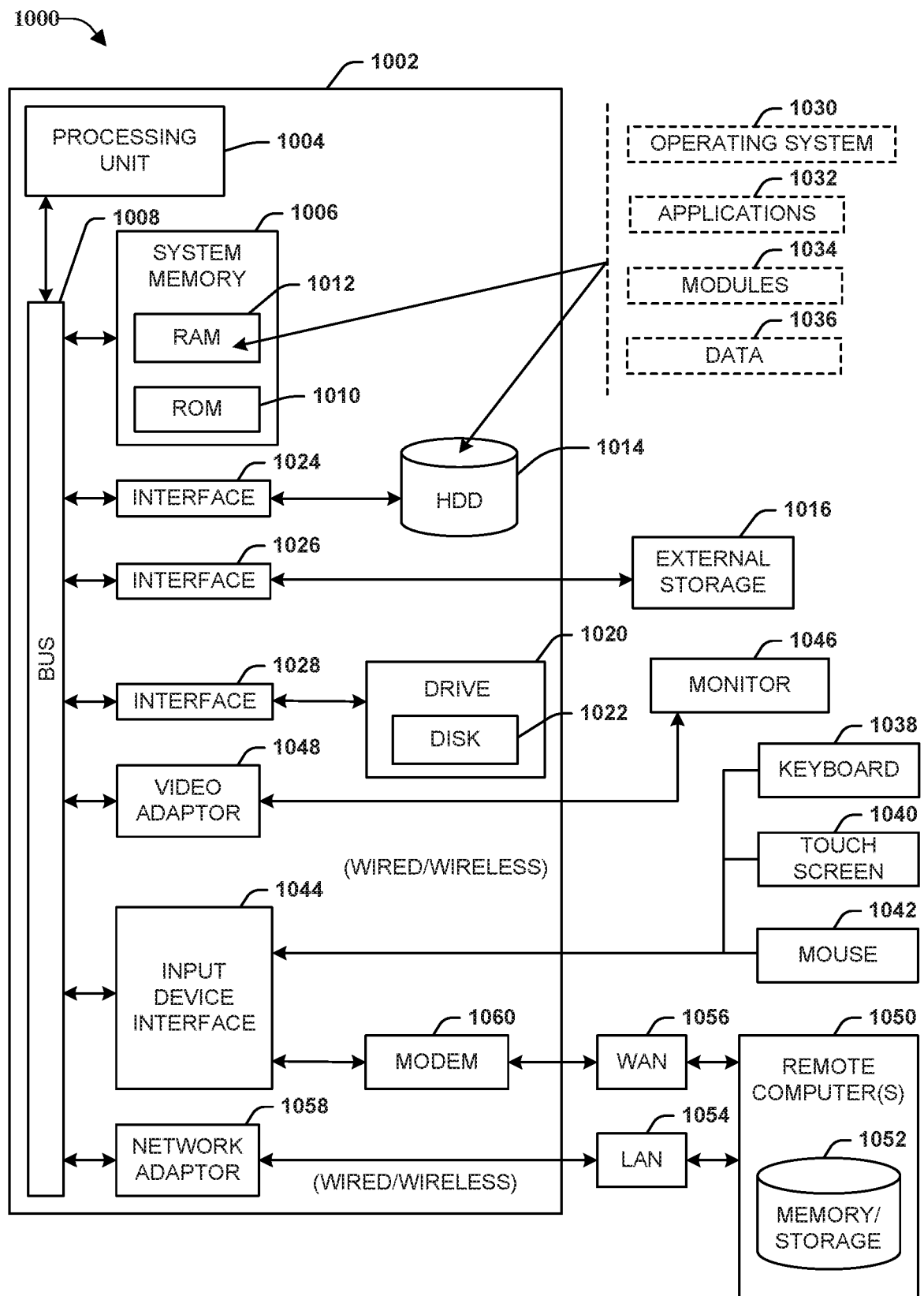
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    identifying, by a device comprising a processor, predicted resource usage of a resource of a first antenna covering a geographic zone;
    selecting, by the device, a group of geographic siting locations within the geographic zone for potentially siting ones of a group of second antennas, wherein selecting the group of geographic siting locations results in the group of geographic siting locations for potentially siting the second antennas, and wherein selecting the group of geographic siting locations is based on utilizing the second antennas in the group of second antennas to maintain the predicted resource usage in a condition in relation to a threshold value of the resource usage; and
    selecting, by the device, a spatial arrangement in relation to the first antenna and the group of geographic siting locations, resulting in the selected spatial arrangement wherein the selected spatial arrangement comprises an arrangement to maintain the predicted resource usage in the condition.

2. The method of claim 1, wherein the threshold value of the resource usage comprises a level of resource availability, and wherein the condition is indicative of an available resource capacity for the first antenna, within the geographic zone.

3. The method of claim 1, wherein the resource comprises an available broadcast spectrum for the first antenna to serve communication demands from user equipment within the geographic zone.

4. The method of claim 1, wherein the geographic zone comprises a coverage area for the first antenna.

5. The method of claim 1, wherein the predicted resource usage comprises a predicted availability of broadcast spectrum for the first antenna, based on a measured indication of broadcast spectrum exhaustion in the geographic zone.

6. The method of claim 5, wherein the measured indication comprises measured broadcast spectrum usage within the geographic zone, over a defined period of time.

7. The method of claim 1, wherein the first antenna comprises a macrocell radio access node, and wherein the group of the second antennas comprises a group of microcell radio access nodes.

8. The method of claim 1, wherein the spatial arrangement comprises a polygon shaped based on a location of the first antenna, and encompassing a subset of the group of geographic siting locations.

9. The method of claim 1, wherein selecting the spatial arrangement of a subset of the group of geographic siting locations comprises clustering ones of the subset of the group of geographic siting locations by utilizing an output of a machine learning analysis.

10. The method of claim 9, wherein a machine learning analysis comprises an unsupervised machine learning analysis employing a neural network.

11. The method of claim 1, further comprising, selecting, by the device, based on a distance between the first antenna and a third antenna, a size of a geographic siting location of the group of geographic siting locations.

12. The method of claim 1, further comprising, based on the spatial arrangement of a subset of the group of geographic siting locations, facilitating placing the second antennas at the subset of the group of geographic siting locations.

13. A first device, comprising:
    a processor; and
    a memory that stores executable instructions that, when executed by the processor, facilitate performance of operations, comprising:
        identifying information corresponding to broadcast spectrum usage within a coverage area of a first antenna;
        based on the information, predicting the broadcast spectrum usage of the first antenna within the coverage area, and
        based on the broadcast spectrum usage being predicted to be in a condition in relation to a threshold first value, communicating a second value corresponding to the broadcast spectrum usage to a second device, wherein the broadcast spectrum usage is to be received by the second device for operations comprising:
    selecting, by the second device, a group of geographic siting locations within the coverage area for potentially siting ones of a group of second antennas, wherein the selecting results in the group of geographic siting locations for potentially siting the ones of the group of second antennas, and wherein the selecting is based on utilizing the ones of the group of second antennas to avoid the broadcast spectrum usage from being in the condition in relation to the threshold first value, and
    selecting, by the second device, a spatial arrangement in relation to the first antenna, and the group of geographic siting locations, resulting in a selected spatial arrangement, wherein the selected spatial arrangement comprises an arrangement to avoid the broadcast spectrum usage from being in the condition in relation to the threshold first value.

14. The first device of claim 13, wherein selecting the group of geographic siting locations is based on an estimated cost of locating the second antennas at ones of the group of geographic siting locations.

15. The first device of claim 14, wherein the estimated cost comprises a distance from a sited antenna to a connection to a backhaul network.

16. The first device of claim 13, wherein the group of the second antennas comprises a microcell antenna to be employed by network equipment of a fifth generation radio access network.

17. The first device of claim 16, wherein selecting the spatial arrangement of the group of geographic siting locations is further based on predicted broadcast spectrum interference between the ones of the group of the second antennas.

18. A non-transitory machine-readable medium, comprising executable instructions that, when executed by a processor of a system, facilitate performance of operations, comprising:

identifying a predicted resource capacity for usage of a macrocell antenna that transmits signals with respect to a geographic zone;

selecting a group of geographic siting locations within the geographic zone for potentially siting ones of a group of microcell antennas, wherein the selecting the group of geographic siting locations results in the group of geographic siting locations for potentially siting ones of the group of microcell antennas, and wherein the selecting is based on utilizing the group of microcell antennas to maintain over a time period, at least the predicted resource capacity for the geographic zone; and selecting a spatial arrangement in relation to the macrocell antenna, and the group of geographic siting locations, resulting in a selected spatial arrangement, wherein the selected spatial arrangement comprises an arrangement of the group of microcell antennas to maintain at least the predicted resource capacity over the time period.

19. The non-transitory machine-readable medium of claim 18, wherein the operations further comprise, based on the selected spatial arrangement, facilitating placing a microcell antenna of the group of microcell antennas at a geographic location of the group of geographic siting locations.

20. The non-transitory machine-readable medium of claim 18, wherein the selected spatial arrangement comprises an arrangement of microcell antennas around the macrocell antenna to form a centralized radio access network, and wherein the microcell antennas are usable to increase broadcast spectrum capacity within the geographic zone covered by the macrocell antenna.

\* \* \* \* \*